United States Patent
Bossard et al.

(10) Patent No.: US 7,025,805 B2
(45) Date of Patent: Apr. 11, 2006

(54) HYDROGEN DIFFUSION CELL ASSEMBLY WITH INTERNAL FLOW RESTRICTOR

(75) Inventors: Peter Bossard, Ivyland, PA (US); Paul D. Bossard, Ivyland, PA (US)

(73) Assignee: Power & Energy, Inc., Ivyland, PA (US)

( * ) Notice: Subject to any disclaimer, the term of this patent is extended or adjusted under 35 U.S.C. 154(b) by 322 days.

(21) Appl. No.: 10/189,225

(22) Filed: Jul. 5, 2002

(65) Prior Publication Data

US 2004/0003715 A1   Jan. 8, 2004

(51) Int. Cl.
B01D 53/22   (2006.01)
B01D 71/02   (2006.01)

(52) U.S. Cl. .................... 95/55; 95/56; 96/8; 96/10

(58) Field of Classification Search ............ 96/4, 96/8, 10; 95/55, 56
See application file for complete search history.

(56) References Cited

U.S. PATENT DOCUMENTS

| | | | | |
|---|---|---|---|---|
| 366,081 A | * | 7/1887 | Edgerton | 423/655 |
| 2,911,057 A | * | 11/1959 | Green et al. | 96/8 |
| 3,274,754 A | * | 9/1966 | Rubin | 96/8 |
| 3,279,154 A | * | 10/1966 | Emerson et al. | 96/8 |
| 3,350,846 A | * | 11/1967 | Makrides et al. | 95/56 |
| 3,665,680 A | * | 5/1972 | Heuser | 96/10 |
| 3,761,382 A | * | 9/1973 | Hammond et al. | 204/266 |
| 4,056,373 A | * | 11/1977 | Rubin | 96/10 |
| 4,472,176 A | * | 9/1984 | Rubin | 95/56 |
| 4,808,199 A | * | 2/1989 | Yearout | 95/49 |
| 5,064,446 A | * | 11/1991 | Kusuki et al. | 95/53 |
| 5,411,662 A | * | 5/1995 | Nicolas et al. | 210/321.8 |
| 5,888,273 A | * | 3/1999 | Buxbaum | 95/56 |
| 6,168,650 B1 | * | 1/2001 | Buxbaum | 95/55 |
| 6,464,759 B1 | * | 10/2002 | Bossard et al. | 96/7 |
| 6,613,132 B1 | * | 9/2003 | Bossard | 96/7 |
| 2001/0000380 A1 | * | 4/2001 | Buxbaum | 95/55 |

* cited by examiner

*Primary Examiner*—Robert H. Spitzer
(74) *Attorney, Agent, or Firm*—LaMorte & Associates

(57) ABSTRACT

A hydrogen diffusion cell that is used to purify contaminated hydrogen gas. The hydrogen diffusion cell has at least one hydrogen diffusion structure that separates a first area from a second area. Normally, the pressure in the first area is kept higher than the pressure in the second area. This causes a pressure differential that causes hydrogen gas to permeate from the first area to the second area. However, an extreme pressure differential can occur when the second area is at its maximum pressure and the first area is inadvertently vented to ambient pressure. Under this extreme pressure differential hydrogen gas permeates from the second area back into the first area at a maximum reverse flow rate. A flow restrictor is provided that limits the flow of gas exiting the first area to a flow rate no greater than the maximum reverse flow rate.

14 Claims, 2 Drawing Sheets

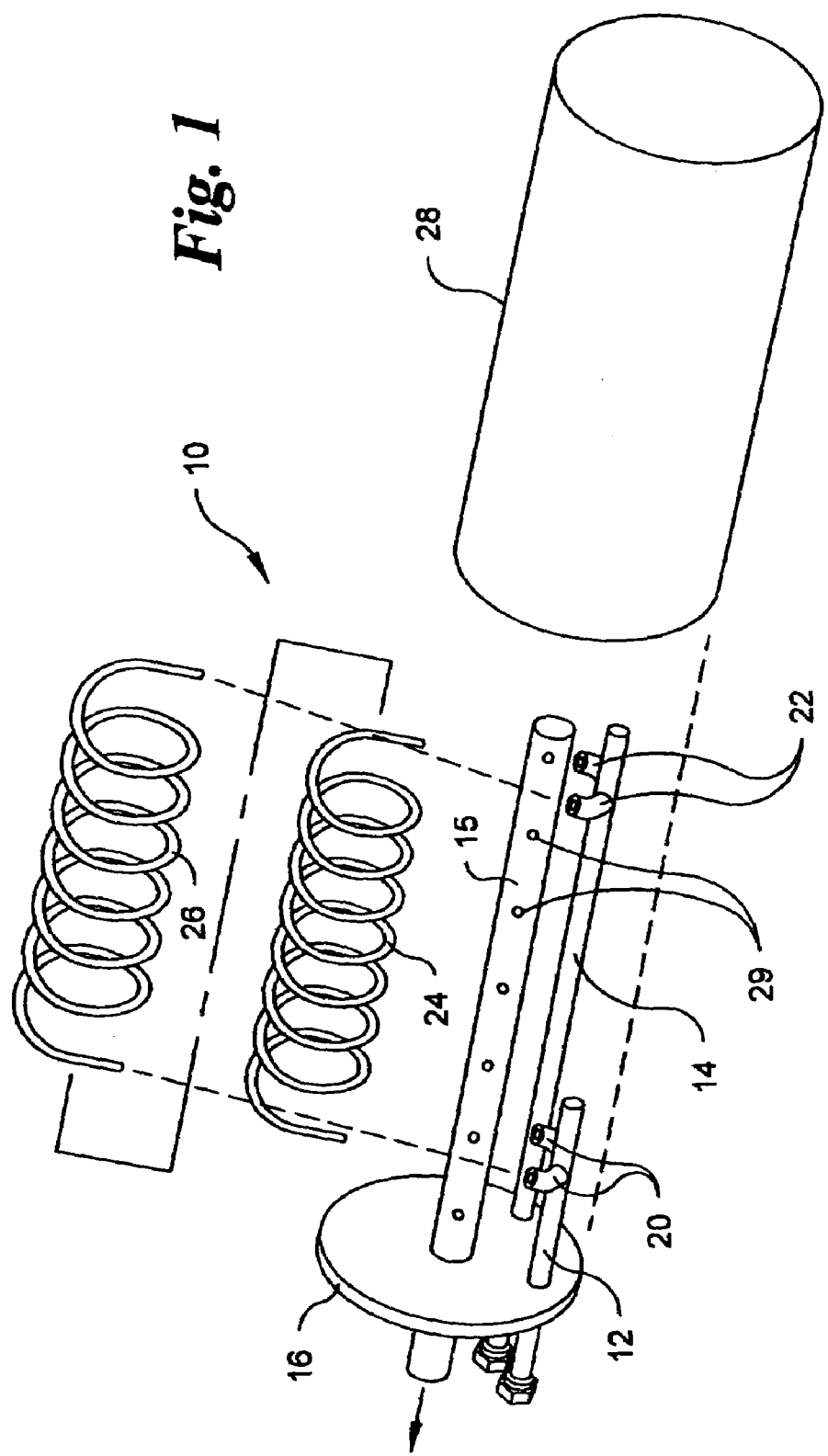

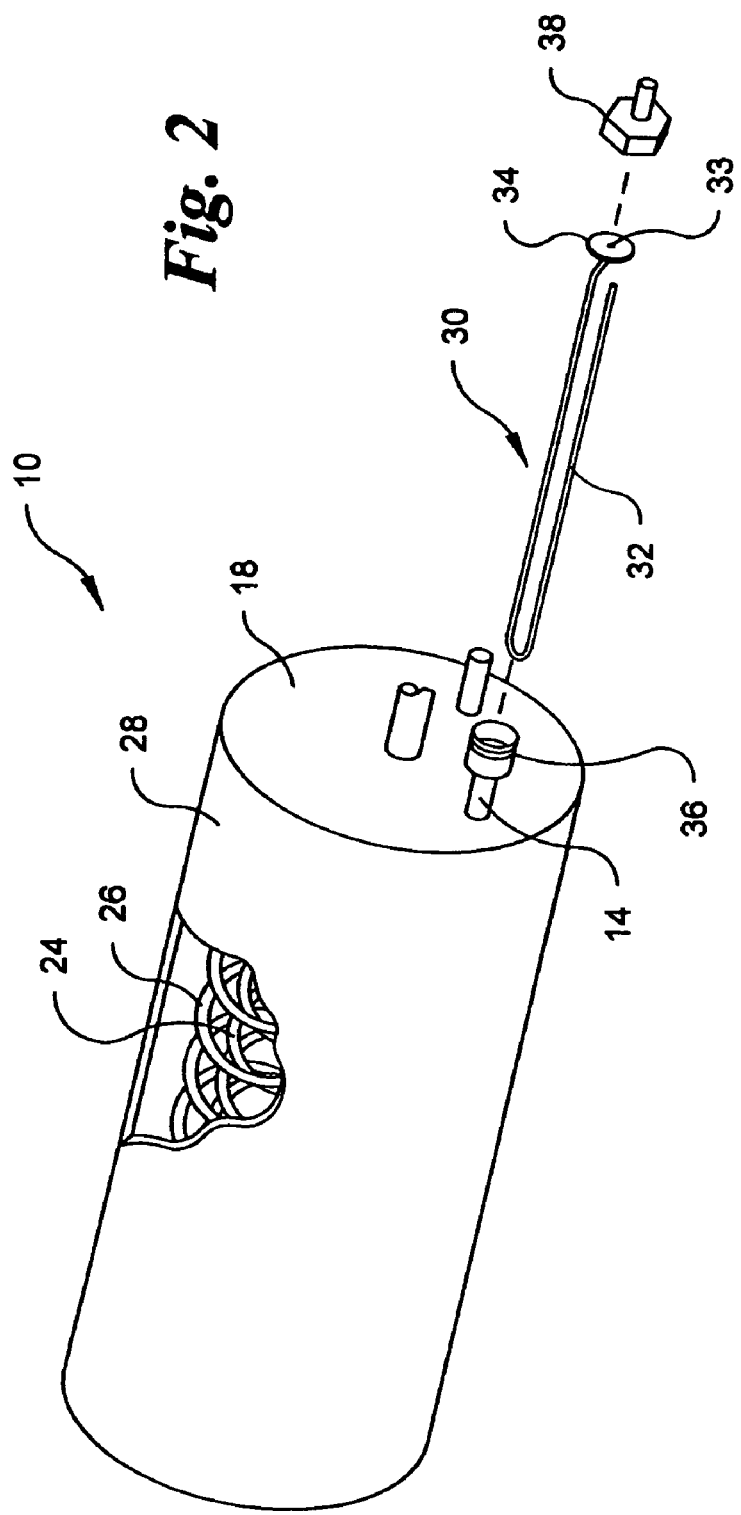

HYDROGEN DIFFUSION CELL ASSEMBLY WITH INTERNAL FLOW RESTRICTOR

BACKGROUND OF THE INVENTION

1. Field of the Invention

In general, the present invention relates to hydrogen diffusion cells. More particularly, the present invention relates to hydrogen diffusion cells that contain wound coils of palladium tubing.

2. Description of the Prior Art

In industry, there are many known techniques for separating hydrogen from more complex molecules in order to produce a supply of hydrogen gas. One such technique is electrolysis, wherein hydrogen gas is obtained from water. Regardless of how hydrogen gas is obtained, the collected hydrogen gas is typically contaminated with secondary gases, such as water vapor, hydrocarbons and the like. The types of contaminants in the collected hydrogen gas are dependent upon the technique used to generate the hydrogen gas.

Although contaminated hydrogen gas is useful for certain applications, many other applications require the use of pure hydrogen. As such, the contaminated hydrogen gas must be purified. One technique used to purify hydrogen is to pass the hydrogen through a hydrogen diffusion cell. A typical hydrogen diffusion cell contains at least one coil of palladium tubing. The palladium tubing is heated and the contaminated hydrogen gas is directed through the palladium tubing. When heated, the palladium tubing is permeable to hydrogen gas but not to the contaminants that may be mixed with the hydrogen gas. As such, nearly pure hydrogen passes through the palladium tubing and is collected for use.

To make the hydrogen gas permeate through the palladium tubing, a pressure differential is typically maintained between the pressure of the contaminated hydrogen gas within the palladium tubing and the pressure of the purified hydrogen gas surrounding the palladium tubing. During the operation of the hydrogen diffusion cell, this pressure differential is typically kept at about twenty pounds per square inch. The structure of the palladium tubing is adequate to operate within this pressure differential without rupturing or otherwise deforming, provided that the pressure within the tubing is greater than the pressure surrounding the tubing. However, on occasions, improper operation and maintenance practices may produce a reverse pressure differential within the hydrogen diffusion cell. During a period of a reverse pressure differential, the pressure surrounding the palladium tubing surpasses the pressure within the palladium tubing. Since, the palladium tubing is typically very thin, only a small reverse pressure differential can cause the palladium tube to collapse.

Periods of reverse pressure differential typically occur during maintenance periods or when the hydrogen diffusion cell is first shut down. When the hydrogen diffusion cell is running properly, the pressure of the contaminated hydrogen gas within the palladium tubing and the pressure of the gas surrounding the palladium tubing are well controlled. However, when the hydrogen diffusion cell is shut off, an operator often vents the contaminated hydrogen gas from within the palladium tubing before venting the pressure of the purified hydrogen gas surrounding the palladium tubing. This results in a reverse pressure differential that can damage the palladium tubing.

A need therefore exists for a system and method of preventing a hydrogen diffusion cell from experiencing reverse pressure to a degree that can cause damage to the palladium tubing within the hydrogen diffusion cell. This need is met by the present invention as it is described and claimed below.

SUMMARY OF THE INVENTION

The present invention is a hydrogen diffusion cell that is used to purify contaminated hydrogen gas. The hydrogen diffusion cell has at least one hydrogen diffusion structure that separates a first area from a second area. Once at an operating temperature, hydrogen gas can diffuse through the hydrogen diffusion structure at a diffusion rate that is dependent upon the pressure differential between the first area and the second area. Normally, the pressure in the first area is kept higher than the pressure in the second area. This causes a pressure differential that causes hydrogen gas to permeate from the first area to the second area. However, an extreme pressure differential can occur when the second area is at its maximum pressure and the first area is inadvertently vented to ambient pressure. Under this extreme pressure differential hydrogen gas permeates from the second area back into the first area at a maximum reverse flow rate.

A flow restrictor is provided that limits the flow of gas exiting the first area. The flow restrictor is calibrated to have a flow rate no greater than the maximum reverse flow rate. Accordingly, should the first area ever be inadvertently vented to ambient pressure, gas cannot leave the first area at a rate grater than hydrogen gas can permeate back into the first area from the second area. The restrictor therefore prevents the occurrence of reverse pressure differentials.

BRIEF DESCRIPTION OF THE DRAWINGS

For a better understanding of the present invention, reference is made to the following description of exemplary embodiments thereof, considered in conjunction with the accompanying drawings, in which:

FIG. 1 is a partially exploded perspective view of the front of a hydrogen diffusion cell in accordance with the present invention; and FIG. 2 is a partially exploded perspective view of the rear of a hydrogen diffusion cell in accordance with the present invention.

DETAILED DESCRIPTION OF THE INVENTION

Referring to FIG. 1, a first exemplary embodiment of a hydrogen diffusion cell 10 is shown in accordance with the present invention. The diffusion cell 10 contains a supply tube 12, a drain tube 14 and an output tube 15. The supply tube 12 supplies unpurified hydrogen gas to the hydrogen diffusion cell 10. The drain tube 14 removes the unused, unpurified hydrogen gas from the hydrogen diffusion cell 10. The output tube 15 removes purified hydrogen gas from the hydrogen diffusion cell 10. The supply tube 12, drain tube 14, and output tube 15 are all made of stainless steel or another inert high strength alloy. The supply tube 12, drain tube 14 and output tube 15 all pass through an end cap plate 16. The supply tube 12, drain tube 14 and output tube 15 are welded to the end cap plate 16 at the points where they pass through the end cap plate 16. To prevent stresses caused by expansion and contraction, the end cap plate 16 is preferably made of the same material, as is the supply tube 12, drain tube 14 and output tube 15.

On the supply tube 12 is located a clustered set of brazing flanges 20. Each brazing flange 20 is a short segment of tubing that is welded to the supply tube 12. The short segment of tubing is made of the same material as is the supply tube 12. Within each clustered set of brazing flanges 20, each brazing flange 20 is a different distance from the end cap plate 16. Furthermore, each brazing flange 20 in the clustered set radially extends from the supply tube 12 at an angle different from that of any of the other brazing flanges 20 in that same clustered set.

In the embodiment shown in FIG. 1, there is only one clustered set of brazing flanges 20 on the supply tube 12 and that clustered set contains two brazing flanges 20. Such an embodiment is merely exemplary. It should be understood that multiple clustered sets of brazing flanges 20 can be present on the supply tube 12 and any plurality of brazing flanges 20 can be contained within each clustered set.

The drain tube 14 also contains clustered sets of brazing flanges 22. The brazing flanges 22 are of the same construction as those on the supply tube 12. The number of clustered sets of brazing flanges 22 on the drain tube 14 corresponds in number to the number of clustered sets of brazing flanges 20 present on the supply tube 12. Similarly, the number of brazing flanges 22 contained within each clustered set on the drain tube 14 corresponds in number to the number of brazing flanges 20 in each clustered set on the supply tube 12.

A plurality of concentric coils 24, 26 are provided. The concentric coils 24, 26 are made from palladium or a palladium alloy. The process used to make the coils is the subject of co-pending U.S. patent application Ser. No. 09/702,637, entitled METHOD AND APPARATUS FOR WINDING THIN WALLED TUBING, the disclosure of which is incorporated into this specification by reference.

The number of brazing flanges 20, 22 in each clustered set corresponds in number to the number of coils 24, 26. One end of each coil 24, 26 extends into a brazing flange 20 on the supply tube 12. The opposite end of each coil 24, 26 extends into a brazing flange 22 on the drain tube 14. The concentric coils 24, 26 have different diameters so that they can fit one inside another. Furthermore, each coil has a slightly different length so that the ends of the coils align properly with the different brazing flanges 20, 22 on the supply tube 12 and the drain tube 14, respectively.

In the embodiment of FIG. 1, there are two coils 24, 26. As such, there are two brazing flanges 20 on the supply tube 12 and two brazing flanges 22 on the drain tube 14. It will be understood that more than two concentric coils can be used. In any case, the number of supply brazing flanges 20 and drain brazing flanges 22 matches the number of coils used. Furthermore, in FIG. 1, the palladium coils have a length only slightly smaller than that of the cylindrical casing 28. It will be understood that multiple palladium coils can be linearly aligned within the cylindrical casing, wherein each of the palladium coils is much shorter than the cylindrical casing. Hydrogen diffusion cells having multiple coils that are linearly aligned are disclosed in co-pending U.S. patent application Ser. No. 09/702,637 that was previously incorporated into this application by reference.

In FIG. 1, the coils 24, 26 have a nearly constant radius of curvature from one end to the other. As such, the coils 24, 26 do not contain any natural stress concentration points that may prematurely crack as the coils 24, 26 expand and contract. To further increase the reliability of the hydrogen diffusion cell 10, the brazing flanges 20 on the supply tube 12 and the brazing flanges 22 on the drain tube 14 are treated. The brazing flanges 20, 22 are chemically polished prior to brazing. Such a preparation procedure produces high quality brazing connections that are much less likely to fail than brazing connections with untreated brazing flanges.

The output tube 15 extends down the center of the hydrogen diffusion cell 10. The coils 24, 26 surround the output tube 15. As such, the output tube 15 extends down the center of the concentrically disposed coils 24, 26. The length of the output tube 15 is at least as long as the length of the coils 24, 26. As such, the output tube is present along the entire length of the coils 24, 26.

The output tube 15 is perforated along its length. The perforation enables purified hydrogen gas to pass into the output tube 15. The holes 29 used to perforate the output tube 15 can have a constant diameter. However, in a preferred embodiment, the holes 29 increase in diameter along the length of the output tube 15, as the output tube 15 extends away from the end cap plate 16. In this manner, the draw of hydrogen gas into the output tube 15 through the various holes 29 remains relatively constant along the entire length of the output tube 15.

Once the coils 24, 26 are placed around the output tube 15 and are attached to both the supply tube 12 and the drain tube 14, the coils 24, 26 are covered with a cylindrical casing 28. The cylindrical casing 28 is welded closed at the end cap plate 16, thereby completing the assembly.

To utilize the hydrogen diffusion cell 10, the cell 10 is heated. Once at the proper temperature, contaminated hydrogen gas is fed into the supply tube 12. The contaminated hydrogen gas fills the coils 24, 26. Purified hydrogen gas permeates through the coils 24, 26 and is collected in the cylindrical casing 28. The purified hydrogen gas is drawn into the output tube 15. The remainder of the contaminated hydrogen gas is drained through the drain tube 14 for reprocessing.

The wall thickness of the tubing used to make the coils 24, 26 is thin to provide for rapid permeation of hydrogen gas through the walls of the coils 24, 26. However, since the walls of the palladium coils 24, 26 are thin, the palladium tubing is easily crushed or otherwise damaged by forces externally applied to the palladium tubing. As has been previously mentioned, such external forces occur when the hydrogen diffusion cell 10 experiences a reverse pressure differential and the pressure within the cylindrical casing 28 surpasses the pressure within the palladium coils 24, 26.

Referring to FIG. 2, it can be seen that within the drain tube 14 of the hydrogen diffusion cell 10 is disposed a flow restrictor assembly 30. The flow restrictor assembly 30 consists of a tube 32 that has a very small and precisely manufactured internal conduit 33. The flow restrictor tube 32 has two ends. One end of the flow restrictor tube 32 is left open. The opposite end of the flow restrictor tube 32 is coupled to a gland plate 34 that is part of a seal assembly. The flow restrictor tube 32 extends through the gland plate 34 and is welded to the center of the gland plate 34. As such, the internal conduit 33 of the flow restrictor tube 32 remains open and exposed on the forward face of the gland plate 34.

The drain tube 14 extends through the end cap 16 of the hydrogen diffusion cell 10. The drain tube 14 terminates with a threaded termination 36 that receives the gland plate 34 at the end of the flow restrictor tube 32. The flow restrictor tube 32 passes into the interior of the drain tube 14 until the gland plate 34 at the end of the flow restrictor tube 32 is received within the threaded termination 36. A seal nut 38 is then used to seal the gland plate 34 into place, thereby completing the seal assembly and completely sealing the interior of the drain tube 34, other than through the conduit 33 of the flow restrictor tube 32 that remains open on the face of the gland plate 34. As such, it will be understood that any gas that is drawn through the drain tube 14 out of the hydrogen diffusion cell 10 must pass through the flow restrictor tube 32.

Contaminated hydrogen gas is drawn out of the hydrogen diffusion cell 10 through the drain tube 14. This means that the contaminated hydrogen gas is drawn through the flow restrictor tube 32 as is passes out of the drain tube 14. The purpose of the flow restrictor tube 32 is to restrict the flow of contaminated gas from within the palladium coils 24, 26 (FIG. 1) so that the pressure within the palladium coils cannot be accidentally allowed to dip below the pressure surrounding the palladium coils within the cylindrical casing 28.

When the hydrogen diffusion cell 10 is in operation, the area within the cylindrical casing 28 that surrounds the coils 24, 26 (FIG. 1) is maintained within a predetermined range of operating pressures. Under normal operating conditions, the range of pressures maintained within the cylindrical casing 28 are less than the range of pressures maintained within the coils 24, 26 (FIG. 1). As such, there is always a positive pressure differential between the interior of the coils and the space surrounding the coils. This caused hydrogen gas to permeate out through the coils into the cylindrical casing 28. However, should the interior of the coils be inadvertently vented to ambient pressure, a reverse pressure differential occurs. The maximum reverse pressure differential occurs when the gas pressure within the cylindrical casing 28 is at the top of its operating pressure range and the interior of the coils are inadvertently vented to ambient pressure.

For a given range of operating temperature and pressure differentials, the palladium coils in every hydrogen diffusion cell have a maximum hydrogen diffusion rate at which hydrogen gas can diffuse through the palladium coils. In addition to operating temperature and pressure differentials, the diffusion flow rate is a function of the diameter of the palladium tubing, the thickness of the palladium tubing, the composition of the palladium tubing, and the length of the palladium tubing present in the coils. The range of operating pressures maintained in the cylindrical casing 28, surrounding the coils 24, 26 (FIG. 1) are known. Likewise, the range of operating temperatures for the hydrogen diffusion cell 10 are known and the physical characteristics of the coils 24, 26 (FIG. 1) are known. Assuming that the pressure in the coils 24, 26 (FIG. 1) was suddenly vented to ambient pressure when the hydrogen diffusion cell 10 was operating at its maximum operating temperature and the pressure within the cylindrical casing 28. A reverse pressure differential would occur, wherein hydrogen gas would diffuse from the cylindrical casing 28 surrounding the coils 24, 26 (FIG. 1) back into the coils 24, 26 (FIG. 1). Since the operating temperature is at its maximum and the reverse pressure differential is at its maximum, the reverse diffusion rate would also be at its maximum.

The flow rate of gas through the flow restrictor tube 32 is a function of the diameter of the conduit 33 within the flow restrictor tube 32 and the length of the flow restrictor tube 32. The flow rate selected for the flow restrictor tube 32 is equal to or less than the maximum reverse diffusion flow rate, as defined in the previous paragraph. Accordingly, should any line connected to the drain tube 14 of the hydrogen diffusion cell 10 be accidentally vented during the operation of the hydrogen diffusion cell 10, the contaminated hydrogen could only exit the drain tube 14 at the flow rate allowed by the flow restrictor tube 32. As the pressure in the palladium coils 24, 26 (FIG. 1) drops below the pressure within the cylindrical housing 28, hydrogen gas would diffuse back into the interior of the palladium coils 24, 26 (FIG. 1) from space within the cylindrical housing 28. Since hydrogen gas can diffuse back into the coils 24, 26 (FIG. 1) at a rate equal to or less than that gas flows through the flow restrictor tube 32, equilibrium is immediately reached. Thus, the pressure within the palladium coils 24, 26 (FIG. 1) will equalize with the pressure surrounding the palladium coils until both pressures match atmospheric pressure. The presence of the flow restrictor tube 32 therefore prevents gas from being drawn out of the palladium coils 24, 26 (FIG. 1) faster than gas can permeate back into the palladium coils. The problems associated with creating a reverse pressure differential are therefore eliminated.

The flow restriction tube 32 is positioned within the drain tube 14 of the hydrogen diffusion cell 10. Consequently, the flow restrictor tube 32 is present with the structure of the hydrogen diffusion cell 10 as the hydrogen diffusion cell 10 operates. The hydrogen diffusion cell 10 has an operational temperature of at least 400 degrees Celsius. As a result, the flow restrictor tube 32 is also maintained this operating temperature. By maintaining the flow restrictor tube 32 at the operational temperature of the hydrogen diffusion cell 10, the flow restrictor tube 32 is kept well above the condensation temperature of any water vapor. Accordingly, if water vapor is contained within the contaminated hydrogen gas that is drawn through the flow restrictor tube 32, the water vapor does not condense and obstruct the small internal conduit 33 of the flow restrictor tube 32.

In the embodiment of FIG. 2, the flow restrictor tube 32 is shown as a curved tube that has a generally U-shaped configuration. Such a configuration is merely exemplary and any length or shape of tubing can be used. If the flow restrictor tube 32 has a very small internal conduit 33, for example a 0.0007 inch diameter, only a small length of this tubing may be needed and no curves on the flow restriction tube would be required. However, the smaller the internal diameter of a flow restrictor tube 32, the more likely it is that a speck of contamination would block flow restrictor tube 32. Consequently, a flow restrictor tube 32 with an internal diameter of at least 0.001 inch is recommended. With such a diameter tube, a long length of tube 32 may be required to obtain the desired restricted flow rate. In such a scenario, the length of flow restrictor tube 32 can be bent so that the tube will fit within the confines of the drain tube 14 in the hydrogen diffusion cell 10.

There are many variations to the present invention device that can be made. For instance, the length and diameter of the flow restrictor tube can be changed. Furthermore, flow restrictors other than lengths of tubing can also be used, provided such flow restrictors fit within the confines of the drain tube. It will therefore be understood that a person skilled in the art can make numerous alterations and modifications to the shown embodiments utilizing functionally equivalent components to those shown and described. All such modifications are intended to be included within the scope of the present invention as defined by the appended claims.

What is claimed is:

1. A method of operating a hydrogen diffusion cell of the type having a hydrogen permeable structure that separates a first area from a second area and permits hydrogen diffusion between said first area to said second area at a known diffusion rate at a maximum pressure differential and operating temperature, said method comprising the steps of:

supplying contaminated hydrogen gas to said first area through a supply tube;

removing purified hydrogen gas from said second area;

removing contaminated gas from said first area through a drain tube, wherein said drain tube includes a flow restrictor that has a flow rate no greater than said diffusion rate.

2. The method according to claim 1, further including the step of maintaining said restrictor at said operating temperature.

3. The method according to claim 1, wherein said restrictor is a length of tube disposed within said drain tube.

4. A hydrogen diffusion cell device, comprising:
a casing defining an internal area, wherein said casing is maintained within a first range of operating pressures;
at least one coil having a first end and a second end, wherein said at least one coil is internally maintained within a second range of operating pressures, wherein a forward diffusion rate of hydrogen gas occurs through said at least one coil when pressure within said at least one coil exceeds pressure within said casing, and a reverse diffusion rate of hydrogen gas occurs through said at least one coil when pressure within said casing exceeds pressure within said at least one coil;
a supply tube extending into said casing for supplying gas to said first end of said at least one coil;
a drain tube extending into said casing for removing gas from said second end of said at least one coil; and
a flow restrictor coupled to said drain tube for restricting flow of gas out of said at least one coil to a predetermined flow rate.

5. The device according to claim 4, wherein a maximum reverse diffusion flow rate of hydrogen gas occurs through said at least one coil when said first range of pressures is at a maximum and said at least one coil are vented to ambient pressure, wherein said predetermined flow rate permitted by said flow restrictor is no greater than said maximum reverse diffusion flow rate.

6. The device according 4, wherein said flow restrictor is disposed within at least part of said drain tube.

7. The device according to claim 4, wherein said flow restrictor is a length of small diameter tubing that is disposed within said drain tube.

8. The device according to claim 7, wherein said drain tube has a first length and said small diameter tubing has a length that is longer than said first length, wherein said small diameter tubing is bent into a configuration that fits within said drain tube.

9. A hydrogen diffusion cell device, comprising:

an enclosure that defines an enclosed area;

at least one hydrogen permeable structure disposed within said enclosure, each said hydrogen permeable structure separating a first area within said enclosure from a second area within said enclosure, wherein hydrogen gas permeates at a predetermined rate through each said hydrogen permeable structure between said first area and said second area, said predetermined rate being a function of a range of pressure differentials between said first area and said second area at a predetermined operating temperature;

a supply tube for supplying contaminated hydrogen gas to said first area within said enclosure;

a drain tube assembly for removing contaminated hydrogen gas from said first area within said enclosure wherein said drain tube assembly is restricted to remove contaminated hydrogen gas from said first area at a gas removal rate no greater than said predetermined rate when said first area is at a minimum pressure and said second area is at a maximum pressure.

10. The device according to claim 9, wherein said drain tube assembly includes a restrictor calibrated to said gas removal rate.

11. The device according to claim 10, wherein said drain tube assembly supports said restrictor within said enclosed area.

12. The device according to claim 10, wherein said restrictor includes a length of tubing having a length and internal diameter that produce said gas removal rate.

13. The device according to claim 12, wherein said drain tube assembly includes a drain tube that extends into said enclosed area and said length of tubing is disposed within said drain tube.

14. The device according to claim 10, wherein said at least one hydrogen permeable structure includes a palladium coil wherein said first area is within said coil and said second area is surrounding said coil.

* * * * *